United States Patent [19]

Uhlmann

[11] 4,011,168

[45] Mar. 8, 1977

[54] ARC TRACK RESISTANT COMPOSITION

[75] Inventor: John G. Uhlmann, Midland, Mich.

[73] Assignee: Dow Corning Corporation, Midland, Mich.

[22] Filed: May 6, 1974

[21] Appl. No.: 466,927

[52] U.S. Cl. .................................. 252/63.7; 252/64; 174/17 SF; 260/37 SB; 339/111; 339/116 C; 106/287 SB; 174/110 S

[51] Int. Cl.$^2$ .......................................... H01B 3/18

[58] Field of Search ........ 174/110 S, 17 FL, 17 SF; 252/63.7, 63.5; 260/37 SB; 106/287 SB; 339/276 C, DIG. 3, 94 R, 111, 116 R, 116 C

[56] References Cited

UNITED STATES PATENTS

| | | | |
|---|---|---|---|
| 2,428,608 | 10/1947 | Bass | 174/110 S |
| 2,550,452 | 4/1951 | Byrne et al. | 175/41 |
| 2,601,337 | 6/1952 | Smith-Johannsen | 174/110.7 |
| 2,645,588 | 7/1953 | Barry | 106/287 SB |
| 2,681,859 | 6/1954 | Wenaas | 106/287 SB |
| 2,875,172 | 2/1959 | Caprino | 174/110.7 |
| 3,021,460 | 2/1962 | Milam | 252/63.5 |
| 3,065,439 | 11/1962 | Krause | 339/111 |
| 3,453,210 | 7/1969 | Wright | 174/110.7 |

*Primary Examiner*—John D. Welsh
*Attorney, Agent, or Firm*—Jack E. Moermond

[57] ABSTRACT

A composition consisting essentially of a specific siloxane fluid and a specific type of filler is disclosed to be useful as an electrical coating particularly where arc track resistant characteristics are needed.

8 Claims, No Drawings

ARC TRACK RESISTANT COMPOSITION

There is employed in the electrical industry materials known in the art as "compounds." These compounds are in reality physical mixtures of materials and generally have a grease-like consistency. These materials should possess excellent electrical insulating properties, have good thermal stability and be water repellent. A high degree of water repellency is particularly desirable or valuable when the material is to be used as a dielectric seal or coating since it prevents the formation of a continuous conductive film of water over the treated surface. Furthermore, the material should be non-corrosive to metals and have no deleterious effect on plastics, rubbers or other materials in which it may come in contact during its use. Compositions of this type found their first commercial use early in World War II as ignition sealing materials for use in the spark plug wells of military aircraft engines.

The compositions of the present invention can be used to insulate and repel water from aircraft, automotive, and marine ignition systems, including spark plug connections. They can also be used to insulate and repel water from disconnect junctions in wiring systems, electrical assemblies, terminals on electrical equipment, and industrial controls which is in circuit breakers. The compositions of this invention are, however, particularly useful as electrical coatings to protect transmission insulators, distribution line insulators, and power sub-station bushings from flashovers. Other uses of the compositions of this invention will be obvious to those skilled in the art with the use of such materials based on the foregoing examples.

The composition of this invention consists essentially of 20–50% by weight of a siloxane fluid having a viscosity of 100–5000 centistokes at 25° C., the substituents on the silicon atoms in the siloxane fluid being hydrocarbon radicals containing 1–18 carbon atoms, and 50–80% by weight of a mineral filler selected from the group consisting of clays, ground quartz, gypsum, amorphous silica and aluminum oxide.

As noted above, any siloxane having a viscosity in the range of 100–5000 cs. at 25° C. and in which siloxane fluid, the substituents on the silicon atoms contain from 1–18 carbon atoms can be employed in the composition of this invention. Such siloxane fluids and their preparation are well known to those skilled in the art of silicone chemistry. Such siloxane fluids are composed predominately of $R_2SiO$ siloxane units. They may contain small amounts, say up to 10 mole percent, of siloxane units of the formula $RSiO_{3/2}$, , $R_3SiO_{1/2}$, and $SiO_2$ units. The R radicals are, of course, the substituents on the silicon atoms and in the case of the fluids useful in the instant invention represent hydrocarbon radicals containing from 1–18 carbon atoms. By way of illustration the hydrocarbon radicals can be alkyl radicals such as the methyl, ethyl, propyl, isopropyl, butyl, tertiary butyl, hexyl, octyl, decyl, dodecyl and octadecyl radicals; alkenyl radicals such as the vinyl, allyl, hexenyl, and dodecenyl radicals; cyclo aliphatic radicals such as the cyclobutyl, cyclohexyl and cyclohexenyl radicals; aryl radicals such as the phenyl, xenyl and naphthal radicals; alkaryl radicals such as the tolyl, xylyl and mesityl radicals; aralkyl radicals such as the benzyl and 2-phenylethyl radicals. Preferred siloxane fluids are those in which the substituents are methyl and/or phenyl radicals with methyl radicals or combinations of methyl and phenyl radicals being more preferable.

As noted above the siloxane fluids useful in the instant invention must have a viscosity in the range of 100–5000 cs. at 25° C. It is preferable, however, that the viscosity of the siloxane fluid employed lie in the range of 350–1000 cs. This viscosity may be the viscosity of a particular siloxane fluid per se used in the instant compositions or it may be the result of the blending of two or more siloxane fluids. In the case where the siloxane fluids are blended, each fluid can have the viscosity within the above specified ranges or it is possible, for example, to blend a siloxane fluid having a viscosity of 100 cs. with a siloxane fluid having a viscosity of 10,000 cs. to arrive at a final fluid viscosity within the 100–5000 viscosity range required for the instant invention.

The siloxane fluid can constitute from 20–50% by weight of the composition of this invention. Although it is preferable that it constitute from 35–45% by weight.

The filler in the composition constitutes from 50–80% by weight and preferably from 55–65% by weight of the composition. The filler is a mineral filler selected from the group consisting of clays, ground quartz, gypsum, amorphous silica and aluminum oxide. Specific examples of the clays are the bentonite and montmorillonite clays. Quartz is, of course, a mineral consisting primarily of silicon dioxide. Gypsum is a mineral consisting primarily of hydrous calcium sulphate. Of the fillers the silica and aluminum oxide fillers are preferred with the aluminum oxide being the most preferred of the filler materials. Best results appear to be obtained when a finely divided filler, i.e., less than 10 microns, is used.

It has also been found in accordance with this invention that the results obtained with the above defined composition can be significantly improved if there is incorporated into the composition up to 6% by weight of a siloxane resin composed of $SiO_2$ units and $(CH_3)_3SiO_{1/2}$ units in which the ratio of the $SiO_2$ units to the $(CH_3)_3SiO_{1/2}$ units is in the range of 1:0.6 to 1:1.1. These resins are commercially available materials well known to those skilled in silicone chemistry and their preparation can be found in numerous places in the literature. When this siloxane resin is employed in the compositions of this invention, it will generally be present in an amount ranging from 2–6% with 3% appearing to be the optimum amount at this time. While it is not completely understood what function this siloxane resin plays in the overall scheme of things, it is believed that it contributes to better arc track resistance by rendering the coating obtained when this composition is applied to a surface more hydrophobic.

In addition to the above ingredients various conventional additives may also be incorporated in the composition of this invention so long as they do not detract from the desired properties thereof particularly the electrical properties. By way of illustration there can be included such conventional additives as a dye, a curing agent, an ultraviolet light stabilizer such as titanium dioxide and a thixotroping agent such as a high surface area silica.

As noted heretofore, the compositions of this invention generally have a grease-like consistency and can be applied to the surfaces where they are to be used by well known means such as a grease gun or by hand wiping or rubbing or by the use of a brush. In some instances, due to the shape or construction of a particular surface it may be desirable to spray the compositions of this invention thereon. When it is desirable to spray the compositions on the surface they must be diluted with a suitable solvent. Examples of solvents that can be used to thin the compositions of this invention for application by spraying include, for example, amyl acetate, benzene, carbon tetrachloride, chloroform, ethylene dichloride, ethyl ether, 2-ethylhexenol, gasoline, hexyl ether, kerosine, methylethyl ketone, mineral spirits, VM &P naphtha, perchloroethylene, stodert solvent, trichloroethylene, xylene, toluene, and laquer thinners. Generally speaking, a solvent which volatilizes readily is preferred with the non-aromatic hydrocarbon and non-aromatic halogenated hydrocarbon solvents being preferred at this time because of ecological considerations involved which make aromatic type solvents undesirable. The process by which the composition of this invention is prepared is critical to the extent that it is necessary that the filler employed by thoroughly dispersed in the siloxane fluid. It is theorized that the thorough mixing allows the siloxane fluid to coat the filler. It is believed at this time that any equipment which will give a sufficiently high shear to get thorough mixing can be employed in preparing the composition of this invention. Of course, starting with a relatively finely divided filler facilitates thorough mixing. The best method known at this time for preparing the compositions of this invention is to add 50% of the siloxane fluid to be employed to all of the filler on a two-roll mill. This mixture has a sufficiently high viscosity to provide the high shear required for proper mixing of the composition and to yield a resulting product that has the enhanced arc track resistant characteristics in accordance with this invention. After the composition has completely mixed and becomes a smooth paste-like material then the remaining half of the siloxane fluid can be slowly added to the mixture and allowed to thoroughly mix in. If it is desired to add a siloxane resin into the composition, the best procedure for that known at this time is to first dissolve the siloxane resin in the siloxane fluid and then proceed as outlined above. Details of a preparation involving the above technique are set forth in the examples which follow.

Now in order for those skilled in the art may better understand how the present invention can be practiced, the following examples are given by way of illustration and not by way of limitation. All parts and percents referred to herein are by weight, and all viscosities measured at 25° C., unless otherwise specified.

Where referred to in the examples the following terms have the specified meanings. "Arc Track" resistance is measured on the inclined plane arc track tester in accordance with ASTM D-2303 except that the composition is placed on top of the test panel instead of the bottom. "Penetration" values (a measure of the compositions consistency) were measured in accordance with ASTM D-217. The "Fog Chamber Test" was carried out using the apparatus and procedure described by R. G. Niemi and T. Orbeck in the article "Test Methods Useful In Selecting Materials For Outdoor High Voltage Insulation," Proceedings 11th EI Conference No. 73CH0777-3EI75, September, 1973. Tap water was used as the spray. A coating of the insulating composition to be tested about 1/16 inch thick was used for these tests. Only current leakage in excess of 0.025 milliamp can be detected in this test. Hence, a report that no abnormal leakage was observed means it did not exceed this 0.025 reading. A specimen is considered to have failed the test when the leakage current reaches 100 milliamps.

EXAMPLE 1

A mixture was prepared which consisted of 3.20 lbs. of a trimethylsilyl endblocked polydimethylsiloxane fluid having a viscosity of 350 cs. and 0.85 lb. of a mixture consisting of 33% of a siloxane resin composed of $SiO_2$ and $(CH_3)_3SiO_{1/2}$ units, the ratio of $SiO_2$ units to the $(CH_3)_3SiO_{1/2}$ units being in the range of 1:0.6 to 1:1.2, and 67% of a trimethylsilyl endblocked polydimethylsiloxane fluid having a viscosity of 100 cs.

One pound of the above prepared fluid-resin mixture was added to 2.85 pounds of alumina (Alcoa Hydral 710, having a specific gravity of about 2.42, a particle size of about 0.7 microns, and containing about 35% water of hydration) on a two-roll mill and thoroughly mixed for about 20 mins. until smooth. A second batch of idential size was prepared in the same manner. About 14% of each batch was lost due to spillage. These two batches (minus spillage) were then mixed together.

To the above alumina-fluid mixture there was then added 0.30 pound of silica (Monsanto DCS) as a thixotropic agent, and mixing continued for about 10 minutes. Next 0.80 pound of the first prepared fluid-resin mixture was added and milled in for about 25 minutes. Then 1.05 pounds of the fluid-resin mixture was added and milled in for about 25 minutes. Finally the resulting product was transferred to a three-roll mill and milled four times.

The composition as prepared above was placed in a clean Fog Chamber for testing of electrical insulating properties. After 2 hours at 36 KV/inch no abnormal leakage current or corona was detected. The composition has an unworked penetration value of 225, a worked value of 346, a value of 327, 2 minutes after working, and a value of 264, 7 minutes after working.

A portion of the above prepared composition was milled an additional three times on the three-roll mill and then tested for electrical properties in the Fog Chamber. No abnormal current leakage or corona was detected after ½ hour at 36 KV/inch.

EXAMPLE 2

A mixture was prepared which consisted of 320g. of a trimethylsilyl endblocked polydimethylsiloxane fluid having a viscosity of 350 cs. and 85g. of a mixture consisting of 33% of a siloxane resin composed of $SiO_2$ and $(CH_3)_3SiO_{1/2}$ units, the ratio of $SiO_2$ units to $(CH_3)_3SiO_{1/2}$ units being in the range of 1:0.6 to 1:1.2, and 67% of a trimethylsilyl endblocked polydimethylsiloxane fluid having a viscosity of 100 cs. This fluid-resin mixture was added to 700g. of alumina (Alcoa Hydral 710) on a Readco Mixer in such a manner as to keep the material on the mill powdery. Initially 58% of the fluid-resin mixture was thick phased with the alumina. After 10 minutes the material in the mixer was still a powder, after 20 minutes it was in the form of ⅛ inch spheres, and after 1 hour the spheres had become about ½ inch in size. At this point another 22–32% of the fluid-resin mixture was added and to the mix. Then 30g. of silica (Monsanto DCS) was added as a thixotropic agent and mixed in for at least 1 hour. Finally, the remaining fluid-resin mixture was added and milled into the composition. This composition was then passed through a three-roll mill three times.

The above prepared composition was placed in the Fog Chamber for testing of its electrical insulating properties. It failed this test after only 12 minutes at 36 KV/inch. The composition was then remilled on the three-roll mill an additional four times and then placed in the Fog Chamber. This time the composition failed the test after 24 minutes.

Then to a sample of the composition there was added more of the fluid-resin mixture to bring the amount of the fluid-resin mixture to 40% of the composition. This was then three-roll milled four times. In the Fog Chamber test no abnormal current leakage or corona was detected after 1.7 hours at 36 KV/inch.

The foregoing example illustrates the importance of proper and thorough mixing of the ingredients as taught in the specification.

EXAMPLE 3

A mixture was prepared which consisted of 78.8g. of a trimethylsilyl endblocked polydimethylsiloxane fluid having a viscosity of 350 cs. and 21.2g. of a mixture consisting of 33% of a siloxane resin composed of $SiO_2$ and $(CH_3)_3SiO_{1/2}$ units, the ratio of $SiO_2$ units to the $(CH_3)_3SiO_{1/2}$ units being in the range of 1:0.6 to 1:1.2, and 67% of a trimethylsilyl endblocked polydimethylsiloxane fluid having a viscosity of 100 cs.

Two electrical insulator coatings were prepared using the above mixture. The first coating (A) consisted essentially of 42.5 parts of the above mixture, 60.0 parts of alumina (Alcoa Hydral 710), and 3.0 parts of silica (Monsanto DCS). The second coating (B) consisted essentially of 37.5 parts of the above mixture and 65.0 parts of alumina (Alcoa Hydral 710).

The above coating compositions were prepared by adding one-half the fluid-resin mixture to the alumina on a two-roll mill and thoroughly thick phase mixed. Then the remaining fluid-resin mixture was thoroughly mixed in, and finally in the case of the first composition the silica was mixed in. As a final mixing procedure the compositions were mixed three times on a three-roll mill.

Composition A had unworked penetration values of 225 and 230, and worked penetration values of 274 and 267. After 65 hours aging these values were—unworked 227, 230 and worked 275, 275, respectively. Composition B had unworked penetration values of 208 and 221, and worked penetration values of 252, and 267. After 65 hours aging these values were—unworked 204, 217 and worked 275, 279, respectively.

Composition A was placed in the Fog Chamber for 0.3 hours at 36 KV/inch and no abnormal current leakage or corona were detected during that time. Composition B was not tested but would be expected to perform similarly well.

EXAMPLE 4

A composition was prepared following the procedure of the preceding example which composition consisted essentially of 35 parts of a trimethylsilyl endblocked polydimethylsiloxane fluid having a viscosity of 1000 cs., 65 parts of alumina (Alcoa Hydral 710), 2.5 parts of a siloxane resin composed of $SiO_2$ and $(CH_3)_3SiO_{1/2}$ units, the ratio of the $SiO_2$ units to the $(CH_3)_3SiO_{1/2}$ units being in the range of 1:0.6 to 1:1.2, and 5 parts of silica (Monsanto DCS). This composition gave good arc track resistance and did not fail the Fog Chamber test after two hours at 36 KV/inch.

A sample of the above prepared composition was diluted with toluene solvent, allowed to stand at ambient conditions for 7 days, and then brush coated on a rod and placed in the Fog Chamber for testing. No failure or leakage was detected after 1 hour at 36 KV/inch.

The above prepared composition, undiluted with solvent, was coated about ⅛ inch thick on the plate and placed in the inclined plane arc track tester. The sample ran 850 minutes without tracking.

EXAMPLE 5

A composition was prepared as in the preceding example except that 4 parts of silica was used. This composition, as prepared and also diluted with toluene, was coated on rods which were placed in a Dew Cycle Weatherometer, along with a rod coated with a current commercially available silicone electrical insulating composition (Dow Corning 5 Compound) which was included for comparison. These rods were left in the weatherometer for 50 hours followed by standing 48 hours at ambient conditions before placement in the Fog Chamber for testing. The undiluted composition of this invention did not fail the Fog Chamber test after 3 hours at 30 KV/inch or 36 KV/inch. The composition diluted with toluene was run one hour at 36 KV/inch and no failure had occurred. The commercially available silicone composition included for comparison failed the Fog Chamber test after only 0.34 hour at 30 KV/inch.

EXAMPLE 6

When the compositions set forth below are prepared by the procedure of the preceding examples, electrical insulating compositions with a grease-like consistency are obtained which compositions possess excellent arc track resistant properties.

A. 25% of a phenyldimethylsilyl endblocked polyphenylmethylsiloxane fluid having a viscosity of 500 cs.
   25% of a trimethylsilyl endblocked polydimethylsiloxane fluid having a viscosity of 200 cs.
   50% of alumina.
B. 20% of a trimethylsilyl endblocked polydimethylsiloxane fluid having a viscosity of 5000 cs.
   80% of alumina.
C. 25% of a hydroxyl endblocked polymethylethylsiloxane fluid having a viscosity of 1000 cs.
   70% ground quartz.
D. 5% of a vinyldimethylsilyl endblocked polydimethylsiloxane fluid having a viscosity of 10,000 cs.
   25% of a trimethylsilyl endblocked polydimethylsiloxane polymethyloctadecylsiloxane fluid having a viscosity of 350 cs.
   65% finely ground clay
   5% of a siloxane resin composed of $SiO_2$ and $(CH_3)_3SiO_{1/2}$ units, the ratio of $SiO_2$ units to $(CH_3)_3SiO_{1/2}$ units being about 1:0.8.

That which is claimed is:

1. A composition consisting essentially of 20 to 50 percent by weight of a siloxane fluid having a viscosity in the range of 100 to 5000 centistokes at 25° C., the substituents on the silicon atoms in the siloxane fluid being hydrocarbon radicals containing 1 to 18 carbon atoms, 50 to 80 percent by weight of a mineral filler selected from the group consisting of clays, ground quartz, gypsum, silica and aluminum, and which also contains up to 6 percent by weight of a siloxane resin composed of $SiO_2$ and $(CH_3)_3SiO_{1/2}$ units, the ratio of the $SiO_2$ units to the $(CH_3)_3SiO_{1/2}$ units being in the range of 1:0.6 to 1:1.2.

2. A composition as defined in claim 1 wherein the siloxane fluid constitutes 35 to 45 percent, has a viscosity in the range of 350 to 1000 centistokes and the radicals contain from 1 to 6 carbon atoms, and the filler constitutes 55 to 65 percent.

3. A composition as defined in claim 2 wherein the radicals are selected from the group consisting of methyl and phenyl radicals, and the filler is selected from the group consisting of silica and aluminum oxide.

4. A composition as defined in claim 3 wherein all the radicals are methyl radicals, and the filler is aluminum oxide.

5. A composition as defined in claim 3 wherein the radicals are both methyl and phenyl radicals, and the filler is aluminum oxide.

6. A composition as defined in claim 3 wherein all the radicals are methyl radicals, and the filler is a combination of aluminum oxide and silica.

7. A composition as defined in claim 1 which also contains a solvent.

8. A composition as defined in claim 7 wherein the solvent is selected from the group consisting of non-aromatic hydrocarbon and non-aromatic halogenated hydrocarbon solvents.

* * * * *